/*page header omitted*/

3,016,408
HYDROHALOGENATION OF MYRCENE
Robert L. Webb, Jacksonville, Fla., assignor to The Glidden Company, Cleveland, Ohio, a corporation of Ohio
No Drawing. Filed Jan. 26, 1960, Ser. No. 4,616
5 Claims. (Cl. 260—654)

This invention relates to an improvement in process for the hydrohalogenation of myrcene with a hydrogen halide such as hydrogen chloride or hydrogen bromide, and more particularly to such process wherein the formation of the undesirable conjugated halide, 2-methyl-2-halo-6-methyleneoctene-7 (e.g., "myrcenyl chloride") is eliminated or maintained at a practical low concentration in the reaction mixture.

The main products of my process are the desirable halides, namely the linalyl halides, i.e., linalyl chloride or bromide, the geranyl halides, i.e., geranyl chloride or bromide, and the neryl halides, i.e., neryl chloride or bromide. Because the geranyl and neryl halides are very close in structure they usually are reported together in analysis.

These main products can be readily converted into esters and alcohols (which are useful in perfume manufacture) by the esterification and hydrolysis procedures shown in my copending application S.N. 760,875 filed on September 15, 1958, and assigned to the Glidden Company.

Additionally these monohalides can be further reacted to form corresponding dihalides by subjecting them to additional hydrohalogenation in accordance with the process shown in copending U.S. Patent application S.N. 760,854, filed on September 15, 1958, by Paul G. Bay.

Therefore it has been proposed to conduct the hydrochlorination of myrcene, optionally in the presence of a solvent such as acetic acid or chloroform, in the absence of a catalyst or in the presence of metallic copper or a univalent copper compound catalyst. Such catalytic methods are successful in largely suppressing formation of the undesirable conjugated halide in the hydrohalogenation, but they teach expressly that a cupric copper compound catalyst is not effective for doing the same.

Thus, U.S. Patent 2,882,323 shows about 40% of the undesirable conjugated halide being formed in this hydrohalogenation when cupric chloride is used and, contrasted with this, 15% and less of the conjugated halide being formed when cuprous compounds or elemental copper are used under comparative conditions.

Also, in my copending application S.N. 760,875, referred to above, the effect of a cupric copper compound is shown to be similar in a hydrohalogenation of myrcene.

My present process gives yields of the desirable halide products comparable to those from previously proposed processes, and it has the advantages thereover of being able to use a relatively cheap, stable, and widely-available cupric compound as a catalyst in the reaction. Furthermore, cuprous compounds that heretofore have been thought unsatisfactory for catalyzing reaction because of having been oxidized to a substantial extent (e.g. 20% or more) to the cupric state in storage or elsewhere also can be used when the precepts of my process are followed.

The essence of my invention involves broadly the finding that cupric compounds are useful catalysts for the hydrogenation of myrcene for obtaining geranyl, neryl, and linalyl halides to the substantial exclusion of said undesirable conjugated halide when the rate of hydrogen halide addition is regulated in a manner correlative with activity of the cupric catalyst present in the reaction mixture for directing the reaction substantially exclusively toward making these desired halides.

Thus, using for example, from about 0.1 to 10% of particulate cupric catalyst (this percentage being calculated on the equivalent elemental copper present rather than on the total weight of the cupric compound itself) based on the weight of original myrcene present in the reaction mixture, and using a temperature and a pressure broadly the same as for a corresponding cuprous-catalyzed reaction, my improvement comprises adding the hydrogen halide such as hydrogen chloride to the reaction mixture at an average rate between about 0.01 and about 30 mols per hour per mol of original myrcene present in the reaction mixture, and correlating said rate of hydrogen halide addition with the establishment and maintenance of a 0 to 10% concentration of the conjugated halide in said reaction mixture.

Thus, for example, the reaction mixture can be analyzed periodically or continuously in conventional manner for the appearance or increase of the conjugated halide, and the resulting analysis be coupled manually or mechanically to a flow control valve operating on the feed of hydrogen halide to the reaction mixture. This, of course, involves a ministerial or mechanical action rather than a mental step.

Broadly, if the concentration of total conjugated substance in the reaction mixture at any stage of hydrogen halide addition indicates that the undesirable conjugated halide is being formed at a rate which would give an undesirably high (above 10%) concentration of said conjugated halide in the end product, it is then possible to add additional catalyst and/or to throttle hydrogen halide feed and thereby suppress the rate of said conjugated halide formation effectively.

For most practical operating purposes I prefer to set the flow of hydrogen halide, e.g., hydrogen chloride, at a fairly uniform rate below that which little or no conjugated material appears in the mixture in a given reactor system. The addition of the hydrogen halide, e.g., hydrogen chloride, is done preferably at a steady rate during the operation in order to maintain the temperature within a safe and desirable narrow control range and to keep it from overloading the heat transfer equipment.

Activity of particulate cupric catalyst in this reaction depends upon its degree of subdivision and its concentration (which I will express herein as cupric copper for purposes of uniformity among the many useful cupric compounds). Advantageously the reaction is run batchwise, but a continuous or semicontinuous reactor such as a tube reactor with concurrent flow of the reactants is also possible. The catalyst can be present as a fixed or mobile bed of solids, but preferably is suspended in the reaction mixture.

Other practical factors affecting the rate of hydrogen halide addition in a particular reaction vessel system include, for example, the available cooling surface per unit weight of reaction mixture being treated, and the temperature of the coolant available to keep the reaction temperature in the desired range; the reaction pressure, higher pressures tending to accelerate the reaction and lower pressures to retard it; and the intensity of the agitation available.

Agitation ordinarily is needed in my operation because the catalyst is best maintained in fairly uniform suspension in a reaction mixture for its greatest effectiveness. No antioxidants such as hydroquinone need be used in my processing, although small amounts can be used, e.g., 0.2% based on original myrcene charged to the reactor. The duration of hydrogen halid addition for satisfactory batch operation of my process can be as short as about ½ hour, and usually is between 40 minutes and 15 hours for the preferred batch operation.

The pressure and temperature for the operation is essentially the same as for a corresponding preparation using cuprous catalyst, e.g., minus 30° to about 50° C. The pressure can be subatmospheric, such as 10 inches of mercury absolute or lower, up to 100 p.s.i.g. or more. Because the reaction mixture is corrosive, glass or glass-lined steel apparatus are preferred, and the pressure limitations on such equipment generally dictate that the reaction be run at about atmospheric to 10 p.s.i.g. for efficiency and economy. The preferred temperature for my operation is generally between about −10° C. and about 30° C. for efficiency and economy. Substantially above about 50° C. undesirable side reactions can take place, and below about minus 30° C. the reaction is unduly sluggish.

The hydrogen halide preferably is anhydrous hydrogen chloride for overall economy in the process. The myrcene used is preferably the product of pyrolyzing beta pinene in conventional fashion; it will contain typically between about 70% and 90% myrcene, the balance being beta pinene, limonene, and small amounts of other materials. However, myrcene from other sources and myrcene of greater or lesser purity can also be used if desired.

The average rate of addition of hydrogen halide, i.e., hydrogen chloride and, less desirably for economy, hydrogen bromide, is expressed in mols per hour per mol of original myrcene charged to reaction vessel because this ratio is readily determinable by simple measurements when operating continuously or batchwise. When the rate of hydrogen halide is substantially below about 0.01 mols per hour per mol of original myrcene charged to the reaction vessel the reaction of this will still proceed satisfactorily, but is unduly prolonged for practical purposes. When the rate of hydrogen halide addition is substantially above about 30 mols per hour per mol of original myrcene present, the reaction requires an impractically high catalyst concentration to suppress substantial formation of the undesirable conjugated halide. As the preferred cupric catalyst concentration is below about 10% and is between 0.1 and 2%, the preferred maximum feed rate of hydrogen halide is about 3 mols per hour per mol of original myrcene charged to the reaction vessel.

The cupric catalyst must be a cupric compound convertible to the bromide or to the chloride under reaction conditions, and it can be an organic or inorganic cupric compound, for example the: chloride, bromide, carbonate, oxide, acetate, formate, sulfate, oleate, resinate, napthenate, nitrate, or the like. Advantageously the cupric catalyst is the chloride in finely-divided state, and preferably it is cupric acetate. Anhydrous catalysts are generally preferred as against hydrated ones, and catalysts yielding strong mineral acids substantially less volatile than hydrogen chloride or hydrogen bromide, e.g., cupric sulfate and cupric nitrate, are less desirable than one not doing so because large amounts of free mineral acid tend to polymerize myrcene and to cyclize desirable halide products into terpenyl chloride.

Many of the organic cupric salts such as cupric acetate and the like are somewhat soluble in myrcene; when addition of hydrogen chloride is commenced, active cupric catalyst precipitates in the reaction mixture in a virtually colloidally-dispersed state and thereby gives the maximum active cupric surface for reaction purposes.

The cupric salt, if added as a solid with the reaction mixture, can be ground mechanically prior to addition or after addition to the myrcene. Such pulverulent solid is advantageously at least about 18 mesh in fineness (U.S. standard sieve size), and preferably is at least about 60 mesh in fineness. Use of coarser solid cupric catalyst requires a longer reaction time or greater catalyst concentration to achieve substantially equivalent results. While as much as about 10% of catalyst (measured as cupric copper and based on the weight of original myrcene charged) can be employed, I have found it much more economical and quite effective to use between about 0.1 and 2% of the cupric catalyst and therefore prefer it.

The following examples show ways in which my invention has been practiced, but should not be construed as limiting the invention. The products obtained in the first four examples were mixed geranyl, linalyl, and neryl chlorides of good quality with only the mercenyl chloride concentration indicated. In the first four examples the reaction vessel used was made of glass, equipped with the stirrer, and vented to atmosphere. The reaction vessel was cooled in an ice bath. In the last example the equipment used was a 1000-gallon agitated, jacketed, glass-lined kettle cooled with brine in the jacket. The catalyst added in all cases was at least 18 mesh in fineness.

The pressure in the first four examples was atmospheric, and in the last example was 2–3 p.s.i.g. The myrcene reactant used was a commercially available beta pinene pyrolysate (myrcene "85") containing about 78% myrcene, 4% beta pinene, 10–12% limonene, and the remainder unanalyzed materials. In the first four examples the reaction temperatures were maintained between 0° and 10° C. except in the run expressly indicated otherwise. In the last example the reaction mixtures were maintained between minus 5° and 0° C. in all runs.

All parts indicated herein are parts by weight, all percentages are weight percentages, and all times are hours. The average rate of hydrogen halide addition was determined by dividing the total mols of hydrogen halide added in the regular running period by the time elapsed in that period and by the mols of original myrcene present at the start of the run. In the first four examples 500 parts of myrcene "85" were used in each run. Anhydrous hydrogen chloride was used in each exemplary preparation. The catalyst concentration is calculated on the total weight of myrcene "85" used.

*Example 1.*—The table following shows the results when hydrochlorinating myrcene with anhydrous hydrogen chloride in the presence of cupric nitrate and cupric bromide.

| Run No. | Catalyst | $Cu^{++}$ Conc., percent | HCl added, parts | Time | HCl addition rate | Percent conjugated material in final product |
|---|---|---|---|---|---|---|
| 1 | 1% $Cu(NO_3)_2$ | 0.338 | 122 | 2.617 | 0.54 | About 10. |
| 2 | 1% $CuBr_2$ | 0.284 | 120 | 2.25 | 0.51 | About 2. |

*Example 2.*—The following table shows the hydrochlorination of myrcene in the presence of various cupric compounds. In each run the catalyst was ground in myrcene, stirred for ½ hour, then treated for a few seconds with HCl before the regular addition of HCl was started.

| Run No. | Catalyst | $Cu^{++}$ conc., percent | HCl added, parts | Time | HCl addition rate | Percent conjugated material in final product |
|---|---|---|---|---|---|---|
| 1 | 1% $Cu(CH_3COO)_2$ | 0.324 | 122 | 2.67 | 0.437 | 0. |
| 2 | 1% $CuCl_2$ plus 10% acetic acid. | 0.47 | 121 | 2.67 | 0.493 | About 4–6. |
| 3 | $CuCO_3$ | 0.58 | 122 | 2.75 | 0.424 | Do. |
| 4 | Cupric Formate | 0.415 | 121 | 2.33 | 0.497 | About 5–7. |

*Example 3.*—The last run in the series tabulated immediately below was run at 25° C. In these runs myrcene saturated with HCl was stirred for ½ hour with the catalyst before regular addition of hydrogen chloride was started.

| Run No. | Catalyst | Cu++ conc., percent | HCl added, parts | Time | HCl addition, rate | Percent conjugated material in final product | |
|---|---|---|---|---|---|---|---|
| 1 | 1% Cu(CH₃COO)₂ tech. grade. | 0.324 | 123 | 2.67 | 0.441 | About 2-3. |
| 2 | 0.4% Cu(CH₃COO)₂ tech. grade. | 0.13 | 121 | 2.5 | 0.462 | About 5-6. |
| 3 | 2% Cu(CH₃COO)₂ tech. grade. | 0.648 | 120 | 2.083 | 0.55 | About 0-1. |
| 4 | 1% Cu(CH₃COO)₂*. | 0.324 | 142 | 0.67 | 2.03 | 0. |
| 5 | 1% Cu(CH₃COO)₂*. | 0.324 | 119 | 2.83 | 0.402 | 0. |
| 6 | 1% Cu(CH₃COO)₂*. | 0.324 | 124 | 0.67 | 1.78 | About 4-5. |

*Reagent grade.

*Example 4.*—In the following tabulated runs the cupric compounds were ground in myrcene and stirred for 30 minutes in the presence of a small amount of dissolved hydrogen chloride before the regular addition of hydrogen chloride was started.

| Run No. | Catalyst | Cu++ conc., percent | HCl added, parts | Time | HCl addition, rate | Percent conjugated material in final product |
|---|---|---|---|---|---|---|
| 1 | 1% cupric resinate | <0.1 | 122 | 2.417 | 0.484 | About 4-5. |
| 2 | 1% CuSO₄.10H₂O | 0.187 | 121 | 2.45 | 0.473 | About 5-6. |
| 3 | 1% CuCl₂ | 0.47 | 121 | 2.917 | 0.397 | About 6-7. |
| 4 | 1% cupric oleate | 0.11 | 121 | 3.00 | 0.386 | About 3-4. |

*Example 5.*—In the following plant scale trials the analyses indicated that the hydrochloroination products were 40–45% linalyl chloride, 15–18% alpha terpinyl chloride, 30–35% neryl plus geranyl chloride, and no undesirable conjugated halide (i.e., myrcenyl chloride). In each of the operations the hydrochlorination products were treated to convert the linalyl, neryl and geranyl chlorides into crude linalyl acetate using the acetic acid, sodium acetate and cuprous chloride treatment. The crude linalyl acetates obtained were identical within the accuracy of the analysis, and all three were of the same composition as a crude linalyl acetate formed from the cuprous chloride catalyzed hydrochlorination product of myrcene produced under comparable conditions. In all of these runs the quantity of myrcene "85" used was 4745 pounds and the quantity of catalyst used was 47 pounds.

In the first run 1115 pounds of HCl were added. In the second run 1118 pounds of HCl were added. In the third run 1106 pounds of HCl were added. The operating times for these three runs were 13.75, 16.5, and 17.5 hours, respectively. The HCl addition rate in the first run was 0.0814; in the second run 0.0691; and in the third run 0.0643.

In the first run cupric carbonate was used as the catalyst. In the second run cupric acetate was used as the catalyst. In the third run anhydrous cupric chloride was used as the catalyst. When the crude ester from the run using cupric carbonate was washed with water some emulsification took place. Accordingly, this catalyst was deemed less desirable than cupric chloride or cupric acetate for this service.

An important observation is that, while the overall yield of desirable halide products is comparable in both cupric and cuprous copper-catalyzed hydrohalogenations of myrcene, the cupric copper-catalyzed operation yields a greater proportion of linalyl halide than does the corresponding cuprous copper-catalyzed operation, e.g. 40–50% linalyl chloride in the cupric copper-catalyzed hydrochlorination of myrcene as compared to 10–15% linalyl chloride in a typical cuprous-catalyzed one. As the linalyl halide can be isomerized, if desired, by maintaining it at room temperature or below in the presence of cuprous chloride and hydrogen chloride as shown in my copending application S.N. 760,875, the present process provides additional flexibility in directing the hydrohalogenation of myrcene towards the production of specific halide products.

I claim:
1. In a process for the hydrohalogenation of myrcene in a myrcene-containing reaction mixture with a hydrogen halide selected from the group consisting of hydrogen chloride and hydrogen bromide in the presence of cupric catalyst at a temperature in the range of about minus 30° to about plus 50° C., and at a pressure between subatmospheric and about 100 p.s.i.g. to obtain geranyl, neryl, and linalyl halides to the substantial exclusion of the conjugated halide, 2-methyl-2-halo-6-methylene-octene-7, the improvement which consists essentially of establishing and maintaining a cupric catalyst concentration, measured as elemental copper and based on the weight of myrcene charged to the reaction mixture, of between 0.1 and 10% and cupric catalyst particle size of at least about 18 mesh fineness, adding the hydrogen halide to the reaction mixture at an average rate between about 0.01 and about 30 mols per hour per mol of original myrcene charged to said reaction mixture, and correlating said rate of hyrogen halide addition with the maintenance of a 0–10% concentration of said conjugated halide in said reaction mixture.

2. The process of claim 1 wherein the hydrogen halide used is hydrogen chloride, and the geranyl, neryl, and linalyl halides obtained are chlorides.

3. The process of claim 2 wherein the cupric catalyst is suspended in the reaction mixture, and the rate of hydrogen chloride addition is maintained at about 0.01 and 3 mols per hour per mol of myrcene charged to the reaction mixture.

4. The process of claim 3 wherein the particulate cupric catalyst is in a virtually colloidally-dispersed state, the pressure used is between atmospheric and about 10 p.s.i.g., and the temperature used is between about minus 10° and 30° C.

5. The process of claim 3 wherein the cupric catalyst concentration is between 0.1 and 2%.

References Cited in the file of this patent
UNITED STATES PATENTS
2,882,323  Weiss _____ Apr. 14, 1959